United States Patent
Vanbemmel et al.

(10) Patent No.: US 6,720,068 B1
(45) Date of Patent: Apr. 13, 2004

(54) SOUND ABSORBENT THIN-LAYER LAMINATE

(75) Inventors: William Ray Vanbemmel, Crown Point, IN (US); Anthony C. Vulpitta, Crown Point, IN (US); Thorsten Alts, Gross-Bieberau (DE)

(73) Assignee: Rieter Automotive (International) AG, Zollikon (CH)

( * ) Notice: Subject to any disclaimer, the term of this patent is extended or adjusted under 35 U.S.C. 154(b) by 0 days.

(21) Appl. No.: 09/623,420

(22) PCT Filed: Mar. 1, 1999

(86) PCT No.: PCT/CH99/00094

§ 371 (c)(1), (2), (4) Date: Sep. 1, 2000

(87) PCT Pub. No.: WO99/44817

PCT Pub. Date: Sep. 10, 1999

(30) Foreign Application Priority Data

| Mar. 3, 1998 | (CH) | 0501/98 |
| Nov. 12, 1998 | (CH) | 2270/98 |

(51) Int. Cl.[7] .................................................. B32B 5/22
(52) U.S. Cl. ................. 428/317.9; 428/340; 428/317.1; 428/315.7; 442/340; 442/341; 442/344; 442/381; 442/394; 442/903
(58) Field of Search .............................. 428/340, 317.9, 428/317.1, 315.7; 442/340, 341, 344, 381, 394, 903

(56) References Cited

U.S. PATENT DOCUMENTS

| 4,283,457 A | * | 8/1981 | Kolsky et al. | 428/285 |
| 5,298,694 A | * | 3/1994 | Thompson et al. | 181/286 |
| 5,364,681 A | * | 11/1994 | Pate et al. | 428/137 |
| 5,773,375 A | * | 6/1998 | Swan et al. | 442/340 |

* cited by examiner

Primary Examiner—Elizabeth M. Cole
Assistant Examiner—Hai Vo
(74) Attorney, Agent, or Firm—Gary M. Nath; Marvin C. Berkowitz; Joshua B. Goldberg

(57) ABSTRACT

The invention relates to a sound absorbent thin-layer laminate consisting of at least one open-cell support layer and a second open-cell fibre layer. The support layer consists either of a first fibre layer, especially a low-density nonwoven material with a mass per unit area of less than 2,000 g/m² and a thickness of less than 50 mm, or of an open-cell foam layer, especially an ultra-light plastic foam with a density of between 16 and 32 kg/m³ and a thickness of at least 6 mm. The second fibre layer is made of melt-blown microfibres, whose fibre diameter is approximately 1 to 10 μm, especially 2 to 5 μm. The air resistance of the thin-layer laminate is in the range of $500<R_t<4,000$ Ns/m³. According to the method for producing the thin-layer laminate a microfibre layer of melt-blown microfibres with a diameter of between 1 and 10 μm, preferably between 2 and 5 μm, is fixed to the support layer by means of a spray-on adhesive.

28 Claims, No Drawings

SOUND ABSORBENT THIN-LAYER LAMINATE

The present invention relates to a sound-absorbing thin-layer laminate according to the precharacterising clause of claim 1, having at least an open-cell backing layer of foam or nonwoven and an open-cell fibre layer, and to a process for the production thereof.

Sound-absorbing thin-layer laminates are used principally in the automobile industry, which is increasingly seeking to produce light, low-cost, low-noise vehicles. This makes it essential to use cheap, thin, light components, which simultaneously exhibit good sound-absorbing properties.

Thus, ultralight sound-insulating vehicle trim is currently known for example from WO-A-98/18656, which is 50% lighter than conventional sound insulation assemblies while retaining identical acoustic efficiency. These sound insulation assemblies substantially comprise an open-cell foam layer, to which a microporous reinforcing layer is applied. In these components, the foam layer, made from thermoformed foam or PU foam, exhibits a thickness of from 10 to 25 mm and the reinforcing layer, made from a thermoplastic mixed fibre nonwoven, exhibit a thickness of from 1.3 to 2.5 mm.

U.S. Pat. No. 5,298,694 describes thin nonwoven laminates for lining vehicle doors. These laminates comprise a nonwoven at least 5 mm thick consisting of thermoplastic fibres and laminated with a thin woven fabric, a fibrous web, a film or a foil. The nonwoven, which is at least 5 mm thick, consists of a mixture of melt-blown microfibres and crimped bulking fibres. Owing to the relatively large diameter of the microfibres (up to 15 $\mu$m) and the fact that air flow resistance in the individual layers is not regulated or specified, the sound-absorbing properties of these materials are not optimised and these materials do not take account of sound absorption in particular in relation to lower frequencies.

Air flow resistance may be unambiguously determined using measuring methods as stated in DIN standard 52 213.

Owing to the relatively large diameter of the fibres used (5–15 $\mu$m), these nonwoven laminates essentially exhibit a backing function and are distinguished by their mechanical properties, the sound-absorbing performance thereof being rather average.

The object of the present invention is to provide in a simple, low-cost manner, an acoustically highly effective, ultralight thin-layer laminate. In particular, a laminate is to be provided which exhibits excellent sound-absorbing properties (with comparable thickness) at lower frequencies while at the same time exhibiting a certain degree of structural stability.

This object is achieved according to the invention by a sound-absorbing thin-layer laminate having the features of claim 1 and in particular by a thin-layer laminate consisting of two different materials. The laminate according to the invention comprises a thin layer of microfibres, which is bonded to a backing layer consisting of an low-density open-cell nonwoven. In a preferred embodiment, the microfibres consist of melt-blown polypropylene and comprise a fibre diameter of approximately 2–5 $\mu$m. It goes without saying that these microfibres may also be produced from a different polyolefin, polyester, polyurethane or nylon. The microfibre layer attains a thickness of only 0.2 to 1.0 mm, and in particular 0.3 to 0.7 mm and has a weight per unit area of 20 to 200 g/m$^2$, and in particular 30 to 100 g/M$^2$. The backing layer used according to the invention comprises a weight per unit area of less than 2000 g/m$^2$ and a thickness of up to 50 mm and may be made of cotton fibres, synthetic fibres or another fibre mixture. According to the invention, if the backing layer consists of an open-cell foam, it exhibits a low density of from 1 to 2 lb/ft$^3$ (16 to 32 kg/m$^3$) and may be made from polyurethane or another foamed plastics. The microfibre layer is adhered in simple manner to the nonwoven or foam layer.

It has emerged that coating an open-cell, "low density" foam or an open-cell, sparingly compacted nonwoven layer with an extremely thin layer of microfibres, in accordance with the invention, produces a component which exhibits a surprisingly high absorption coefficient. This results in highly effective sound-absorbing thin-layer components with low weight per unit area. Furthermore, the microfibre layer has proven to be water-repellent and thus also allows use of the thin-layer laminates according to the invention in a moist or wet environment.

Thin-layer laminates are hereinafter understood to be laminates which comprise a thin microfibre layer 0.2 to 1.0 mm, in particular 0.3 to 0.7 mm thick.

The sparingly compacted nonwoven backing layer advantageously comprises fibres which are bonded with thermoplastic fibres or thermosetting plastic resins, to enable sound-absorbing vehicle parts, in particular carpets or dashboard trim, to be formed during manufacture into specified shapes by means of treatment with pressure and heat.

In modifications of the thin-layer laminate according to the invention, a third layer of nonwoven may be applied over the microfibre layer. This third nonwoven layer may further improve the sound-absorption capacity of the thin-layer laminate and protects the extremely thin microfibre layer from possible abrasion.

What is claimed is:

1. A sound-absorbing thin-layer laminate comprising at least a backing layer and an open-celled fibre layer, wherein said backing layer consists of an open-celled plastic foam layer with a density of 16 to 32 kg/m$^3$ and a thickness of at least 6 mm, wherein the open-celled fibre layer consists essentially of melt-blown microfibres, the diameter of which ranges from 1 to 10 micrometers, and a weight per unit area of from 20 to 200 g/m$^2$, wherein the thin-layer laminate exhibits air flow resistance in the range of 500<$R_r$<4000 Ns/m$^3$.

2. A thin-layer laminate according to claim 1, wherein the foam layer has a thickness of 6 to 15 mm, and a weight per unit area of 100 to 250 g/m$^2$.

3. A thin-layer laminate according to claim 2, wherein the foam layer consists of an open-cell polyurethane foam.

4. A thin-layer laminate according to claim 2, wherein the foam layer exhibits a thickness of 9 mm.

5. A thin-layer laminate according to claim 2, wherein the foam layer exhibits a weight per unit area of 166 g/m$^2$.

6. A thin-layer laminate according to claim 1, wherein the microfibre layer has a thickness of from 0.3 to 0.7 mm and a weight per unit area of from 30 to 100 g/m$^2$ and a density greater than 50 kg/m$^3$.

7. A thin-layer laminate according to claim 1, wherein the microfibre layer produces air flow resistance in the range of 500<$R_r$<3000 Ns/m$^3$.

8. A thin-layer laminate according to claim 7, wherein the microfibre layer produces air flow resistance of about 1500 Ns/m$^3$.

9. A thin-layer laminate according to claim 1, wherein the microfibres of the fibre layer are made from melt-blown polyolefin, polypropylene, polyester, polyurethane or nylon.

10. A thin-layer laminate according to claim 1, wherein the fibre diameter of the microfibres ranges to approximately 3 $\mu$m.

11. A thin-layer laminate according to claim 1, wherein the backing layer and the microfibre layer are bonded together by means of a spray-on coupling agent.

12. A thin-layer laminate according to claim 11, wherein the spray-on coupling agent consists of a water-based cross-linking pressure-sensitive adhesive.

13. A thin-layer laminate according to claim 1, wherein a nonwoven outer layer is attached to the microfibre layer.

14. A thin-layer laminate according to claim 13, wherein the nonwoven outer layer consists of a mixture of cellulose fibres and polyester fibres.

15. A thin-layer laminate according to claim 13, wherein the nonwoven outer layer comprises polypropylene fibres.

16. A thin-layer laminate according to claim 13, wherein the nonwoven outer layer is an ultrasonically bonded, melt-blown spun yarn.

17. A thin-layer laminate according to claim 13, wherein the nonwoven outer layer has a weight of 10 to 25 g/m$^2$.

18. A thin-layer laminate according to claim 17, wherein the nonwoven outer layer has a weight of 17 g/m$^2$.

19. A thin-layer laminate according to claim /13, wherein the nonwoven outer layer has a thickness of from 0.5 to 2.0 mm.

20. A thin-layer laminate according to claim 19, wherein the nonwoven outer layer exhibits a thickness of 1 mm.

21. A thin-layer laminate according to claim 1, wherein the diameter of the melt-blown microfibres ranges from 2 to 5 $\mu$m.

22. A thin-layer laminate according to claim 1, wherein the microfibre layer has a thickness of from 0.3 to 0.5 mm.

23. A thin-layer laminate according to claim 1, wherein the microfibre layer has a weight per unit area of from 35 to 45 g/m$^2$.

24. A thin-layer laminate according to claim 1, wherein the microfibre layer has a weight per unit area of 40 g/m$^2$.

25. A process for producing a thin-layer laminate according to claim 1, comprising attaching the microfibre layer to the backing layer by means of a spray-on.

26. A process according to claim 25, comprising forming the thin-layer laminate into the desired shape by means of treatment with pressure and heat.

27. A method for noise-reduction in motor vehicles, comprising applying a thin-layer laminate according to claim 1 to said motor vehicle.

28. The method of claim 27, wherein the thin-layer laminate is applied as a component selected from the group consisting of a dashboard trim, floor covering, door trim, roof liner, boot, engine compartment liner, and mixtures thereof.

* * * * *